May 27, 1941. Y. TODA 2,243,584
VOLTAGE REGULATION
Filed July 12, 1940
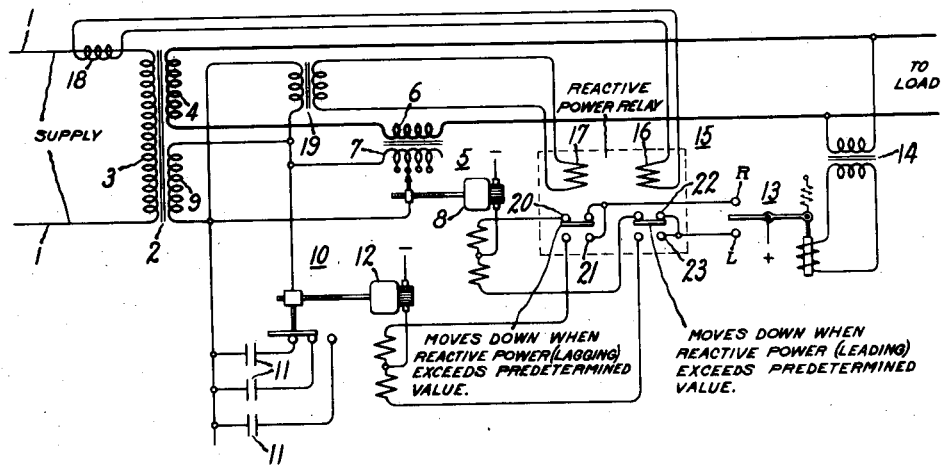
Inventor:
Yoshiaki Toda,
by Harry E. Dunham
His Attorney.

Patented May 27, 1941

2,243,584

UNITED STATES PATENT OFFICE 2,243,584

VOLTAGE REGULATION

Yoshiaki Toda, Tokyo, Japan, assignor to General Electric Company, a corporation of New York Application July 12, 1940, Serial No. 345,200
In Japan September 4, 1939

3 Claims. (Cl. 171—119)

This invention relates to voltage regulation and more particularly to improvements in automatic voltage regulating systems for alternating current power circuits.

This invention is practiced by providing an alternating current power circuit with two different kinds of voltage regulating means which are most effective under different operating conditions of the circuit and selecting, under the primary control of voltage responsive means, which one of these regulating means is to be operated in accordance with an electrical condition of the circuit other than voltage.

An object of the invention is to provide a new and improved voltage regulator system.

Another object of the invention is to provide a voltage regulator system having separate regulators, each of which is best adapted for regulating voltage under different operating conditions other than voltage of the circuit and selectively controlling the operation of these regulators in accordance with the value of such conditions.

The invention will be better understood from the following description taken in connection with the accompanying drawing and its scope will be pointed out in the appended claims.

Referring now to the single figure of the accompanying drawing, which illustrates schematically and diagrammatically an embodiment of the invention, there is shown therein a main alternating current power circuit 1. Connected in this circuit is a power transformer 2 having a primary winding 3 adapted to be connected to a suitable source of current supply and having a secondary winding 4 adapted to be connected to a variable power load.

For regulating the no-load voltage, as well as the voltage under load, of the load circuit there is provided a voltage regulator 5 for inserting a variable voltage in series with the load circuit. This regulator may be of any suitable type and is shown, for example, as a so-called step regulator consisting of a transformer having a secondary winding 6 serially connected in the load circuit and having a primary winding 7 provided with taps which may be changed by a motor-operated tap-changer mechanism 8. The excitation of the primary winding 7 may be obtained in any suitable manner, as for example, from a tertiary winding 9 on the main power transformer.

For supplementing the regulator 5 and relieving it of the duty of regulating the voltage, particularly under adverse conditions of circuit operation, such, for example, as when the reactive power in the load circuit is relatively high, there is provided a voltage drop regulator 10. This regulator is shown by way of example as consisting of a plurality of capacitors 11 provided with suitable automatic motor-operated switching means 12 for successively connecting them effectively across the main power circuit by way of the tertiary winding 9. These capacitors draw a quadrature leading current through the supply circuit and this current in flowing through the impedance of the circuit produces a voltage drop. It should be understood, however, that "voltage drop" is used in a generic sense and that actually if the only current in the circuit is the current drawn by the capacitor 11 and the circuit is a conventional circuit having more series inductance than series capacitance the effect will actually be a voltage rise rather than a voltage decrease or drop in the literal sense of the term. However, in most cases the main power load will have a lagging component of current which will exceed the leading current taken by the capacitors 11 so that, in effect, the capacitor current will reduce the effective reactive current in the circuit and under those conditions the regulator 10 will actually control the voltage drop in the circuit in the literal sense of the term.

The primary control of the regulators 5 and 10 is in response to the voltage of the load circuit and is accomplished by a primary voltage sensitive relay or contact-making voltmeter 13 connected across the load circuit by a conventional potential transformer 14. This relay has a set of raise contacts labeled "R" and a set of lower contacts labeled "L" which close respectively when the voltage is below and above a predetermined normal value or band width and which are open when the voltage is within the normal band width.

In order to insure that each of the two regulators will operate most effectively their control by the primary relay 13 is made selective by means of a selector relay 15. A suitable selector relay is a reactive power relay, that is to say, a relay which measures the reactive volt-amperes of the circuit instead of the active volt-amperes or watts of the circuit. In construction it is quite similar to a wattmetric relay and is provided with current and potential coils 16 and 17 connected to the main circuit 1 respectively by a current transformer 18 and a potential transformer 19. This relay is also provided with four sets of contacts 20, 21, 22 and 23. Contacts 20 and 22 are arranged to remain closed and contacts 21 and 23 are arranged to be open when the reactive power of the circuit is less than a predetermined value or is within a predetermined minimum range. When the reactive power in the circuit exceeds this value in the lagging direction, contacts 20 open and contacts 21 close and when the reactive power exceeds the predetermined value in the leading direction the contacts 22 open and contacts 23 close.

The voltage raising operation of the regulator 5 is controlled by a circuit connection extending from a raise terminal of the operating motor 8 through the contacts 20 and the raise contacts of the primary relay 13 in series. Similarly, the raising operation of the line drop regulator 10 is controlled by a circuit connection from a raise terminal of the motor 12 through the contacts 21 and the raising contacts of the primary relay 13 in series. In a like manner, the lowering circuits for the regulators 5 and 10 are controlled respectively by the contacts 21 and 23 under the master control of the lower contacts of the primary relay. The operating current for the motors 8 and 12 is obtained from any suitable source of control current and for the sake of simplicity the return circuits have not been shown and only the suitable direct current polarity symbols have been applied to the control circuit terminals indicating that these terminals should be connected to opposite sides of any suitable source of control current.

The operation of the illustrated embodiment of the invention is as follows. Assume that the supply side of the circuit is energized, that the load on the circuit is zero and that the voltage at the load end of the circuit is normal. Under these assumed conditions the contacts of the relays 13 and 15 will occupy their illustrated positions. If now the voltage should rise or fall by reason of variations in the supply voltage the lower or raise contacts of the master relay would close, thereby completing circuits through the closed contacts 22 or 20 to the lower or raise terminals of the motor 8 whereby the motor will operate the tap-changer in the proper direction to cause the regulating transformer 5 to return the voltage to normal. If now a resistance load or a load having a relatively high power factor is placed on the circuit the load voltage may fall below normal by reason of the voltage drop in the circuit. This voltage drop will ordinarily be mainly a resistance voltage drop. As the reactive power in the circuit under these conditions will ordinarily not be high enough to cause operation of the contacts of the relay 15 the regulator system will operate as under no-load conditions and the regulator 5 will maintain constant load voltage.

If, however, the load has a relatively high reactive component, such as the magnetizing current of induction motors or induction furnaces, the lagging reactive power in the circuit will exceed the setting of the relay 15 thereby causing the contacts 20 to open and the contacts 21 to close. Furthermore, the reactive current will produce a voltage drop in the circuit which ordinarily is mainly a reactive voltage drop. Consequently, when the voltage falls below normal sufficiently to cause the raise contacts of the primary relay to close, the operating circuit of the motor 12 for the regulator 10 will be completed through the contacts 21 and this regulator will then act to insert additional capacitors effectively in parallel with the main circuit so as to draw an increasing amount of leading current through the circuit. This will neutralize some or all of the lagging current in the main circuit, thereby decreasing the reactance voltage drop in the circuit and tending to raise the load voltage. It will also have the effect of decreasing the reactive power in the circuit. Both of these effects are in the proper direction for causing eventual opening of the raise contacts of the primary relay 13 and opening of the contacts 21 and closing of the contacts 20 of the selector relay 15. Whether the primary relay contacts or the selector relay contacts will operate first depends upon circuit conditions. If the primary relay contacts operate first, all further regulator operation ceases but if the selector relay contacts operate first, the line drop regulator 10 will be stopped and the voltage regulator 5 will be started in a raising direction and will then carry on the regulation until such time as the raise contacts of the primary relay open.

The operation of the regulating system during over-voltage conditions will be similar to that described for under-voltage and should be obvious to those skilled in the art.

While there has been shown and described a particular embodiment of this invention, it will be obvious to those skilled in the art that various changes and modifications can be made therein without departing from the invention and, therefore, it is aimed in the appended claims to cover all such changes and modifications as fall within the true spirit and scope of the invention.

What I claim as new and desire to secure by Letters Patent of the United States is:

1. In combination, an alternating current circuit for delivering energy to a variable power load, a voltage regulator for inserting a variable regulating voltage in series in said circuit, a line drop regulator for varying the voltage drop in said circuit, a primary relay responsive to variations of the voltage of said circuit from a normal value for controlling the operation of said regulators, and a selector relay responsive to an electrical condition of said circuit for preventing simultaneous operation of said regulators.

2. In combination, an alternating current circuit for delivering energy to a variable power load, a voltage regulator for inserting a variable regulating voltage in series in said circuit, a line drop regulator for varying the voltage drop in said circuit by effectively varying the shunt reactance of said circuit, a primary relay responsive to variations of the voltage of said circuit from a normal value for controlling the operation of said regulators, and a selector relay responsive to the reactive power in said circuit for selecting which one of said regulators can be operated under the control of said primary relay.

3. In combination, an alternating current circuit for delivering energy to a variable power load, a variable ratio transformer type voltage regulator for inserting a variable regulating voltage in series in said circuit, a line drop regulator for varying the voltage drop in said circuit by effectively varying the shunt capacitance of said circuit, a primary relay responsive to variations of the voltage of said circuit from a normal value for controlling the operation of said regulators, and a selector relay responsive to the reactive power in said circuit for preventing operation of said transformer type regulator when the reactive power of said circuit exceeds a predetermined value and for preventing operation of said line drop regulator when the reactive power of said circuit is below a predetermined value.

YOSHIAKI TODA.